Sept. 20, 1966          P. F. LA VINE          3,274,019
IMPREGNATION AND COATING WITH SPLIT-OFFS OF
VERMICULITE AND PRODUCTS THEREOF
Filed Nov. 6, 1964

INVENTOR
PAUL F. LAVINE
BY Alton V. Oberholtzer
ATTORNEY

United States Patent Office 3,274,019
Patented Sept. 20, 1966

3,274,019
IMPREGNATION AND COATING WITH SPLIT-OFFS OF VERMICULITE AND PRODUCTS THEREOF
Paul F. La Vine, St. Paul, Minn., assignor of one-half to Alton V. Oberholtzer, White Bear Lake, Minn.
Filed Nov. 6, 1964, Ser. No. 411,178
9 Claims. (Cl. 117—16)

This application is a continuation-in-part of my application Serial No. 676,354, filed August 5, 1957, now abandoned.

This invention relates to the discovery of beneficial useages of exceeding fine, about 400 to 500 mesh size particles of dust fines of vermiculite which were obtained as a by-product dust, separated from the exfoliated vermiculite and grit, produced in the manufacture of vermiculite for making house-fill insulation. Such exceedingly fine material was heretofore considered in the way and while sometimes used as fill-in, as in making fertilizer, it usually was collected in huge piles with the grit and was dumped in an out of the way place, or used as a fill in concrete to get rid of it. More particularly the invention relates to an improvement in providing colored stainless steel and other improved metal coatings, including an improved impregnant and coating for paper and resins, and a method of applying the same.

The application of coarser particles of the ground exfoliated portion of the manufactured vermiculite has been attempted to be used. However, when attempted to be substituted for example, to prevent abrasion, there appears to be a defect in the larger particles which do not coat properly as scoring or scratches appear. This is not true however with the exceeding fine particles with which I experimented and obtained improved results. For example, with regard to the metal coatings this invention or improvement concerns particularly color coatings for stainless steel and other metals, and the method of applying the same, while providing these metal surfaces with the added advantages of closing the surface pores of stainless steel and other metal tanks including metals for general use and motors and the like with rust, acid, alkali and salt resistant coating which reduces friction and also improves resistance to carbon deposit.

It is particularly noted in the 1933 patent of Miner 1,922,448 that "an undesirable and uneconomical quantity of fine dusty particles is produced when the material is handled in the ordinary way in connection with manufacturing." It is therefore apparent that the ordinary way of manufacturing exfoliated vermiculite has long been known to the art and needs no repetition here.

What I have discovered is that such waste or "uneconomical" fine particle material provides the art with new and useful advantages in new appearances and ways of useage of improved products.

As has long being recognized in the art of manufacturing exfoliated vermiculite per se, the process of exfoliating produces a by-product "uneconomical quantity of fine dusty particles," as indicated. These fine dusty particles are collected with grit which is also waste material and a coarse grained gritty substance. What I have done is to collect the fine and grit material, then by careful screening separated out the fines on the order of about a 400 to 500 mesh size and utilized this exceedingly fine or "uneconomical" fine particle material with a new and direct manner of application.

In the ordinary manner of exfoliating vermiculite, the heat treatment expands the vermicule ore to produce an accordion-like structure of vermiculite product, for separation from a gang rock substance such as quartz, asbestos, biotite and green sand. An air separation method is used to separate the expanded vermiculite from this gang rock. In the process of such separation there is separated from the vermiculite the by-product fine "uneconomical" dust particles, which are usually termed "split-offs." Such material does not have the physical structure of the accordion-like vermiculite of the desired product and contains more of the impurities than the desired expanded accordion-like vermiculite per se.

In general and as known to the art, from the manufacturing stand point the vermiculite ore is passed through a furnace to expand. It is then evaluated and passed through a fan which separates the good vermiculite from the rock. The vermiculite is then passed over a ⅛ inch screen and that which is left on the screen is sold for household fill. The balance which passes through the screen, plus the dust from the dust collector is sold and used in making concrete aggregate. Consequently the raw material with which I had to work was the mixed grit and known "economical" waste by-product dust fines that I had to again separate from the grit. As will be recognized, these dust fines may be taken directly from the dust collector and used, as is, without the necessity of mixing in special solutions of mixtures, as hereinafter exemplified. In this connection a larger quantity of "split-offs" or by-product dust fines may be obtained by breaking down the vermiculite ore, before treatment, with care being taken not to powder the rock. Then the fines by-product which are collected, of the fine particle size, as indicated, appears to be air drawn in the dust collector and provides not only new methods of application, but also beneficial applications, as hereinafter exemplified.

In having an analysis made of the material, it was indicated as "vermiculite by-products" in the "sample identification" and the results of the analysis reported, as follows:

| | Percent |
|---|---|
| Iron oxide (Fe$_2$O$_3$) | 5.95 |
| Magnesium oxide (MgO) | 13.0 |
| Alumina (Al$_2$O$_3$) | 7.55 |
| Calcium oxide (CaO) | 1.75 |
| Silica (SiO$_2$) | 41.0 |
| Loss on ingition (mainly water) | 7.20 |
| Sodium and potassium oxide, balance. | |

Spectographic analysis indicates traces of manganese, nickel, copper and titanium.

As stated in the parent application the art has long sought a color coating for stainless steel and a substitute for glass lined tanks which are resistant to bacterial impregnation, rust and salts. Many types of coatings have been attempted which afford synthetic coverings or what seems to be an amalgamated union with the metal. However, stainless steel cans and tanks of the nature used for hauling milk soon become contaminated by bacteria impregnating the pores from which they cannot be removed even when extraordinary care is used in washing the tanks clean. It appears that no satisfactory coating, other than a glass lining has been effective. As a consequence, fresh milk sours very rapidly in a tank only a short time after it has been in use. Further, there has been a problem in properly coating metals to render them rust resistant, resistant to carbon deposit and fungus and barnacle growth. For example, there is a need for coatings on steel or low carbon iron which provide the qualities of galvanized metal without galvanizing. Further, there is a need for a friction resistant coating applied to metals subject to friction, metals exposed to atmospheric and stratosphere flight, metals exposed to alkali and salt solution, and metals subject to carbon deposits. Also there is need for a base coating on metals which more readily cause paints and enamels to adhere thereto.

Accordingly, it is an object of this improvement to provide a method for economically coloring stainless steel and the colored stainless steel products produced thereby.

Another object of this improvement is to provide coatings for stainless steel tanks and other metal containers and tubing which render them resistant to bacteria impregnation in the handling of milk and other microscopic impregnating growths which cause spoilage of milk and bakery products.

An additional object of this improvement is to provide an inorganic coating on metals which closes the surface pores, reduces surface friction, renders the metal resistant to rust, acids and salts or provides a base coating for paints and enamels.

A further object of this improvement is to provide metals, resins and paper materials having their surface impregnated or coated with on the order of 400 mesh to 500 mesh size dust fines of a vermiculate material with retained impurities of a like size which reduces surface friction, is resistant to acids and heat, reduces electrostatic charging, and is resistant to carbon deposit.

Another object of this invention is to provide for a method of treating and coating of metals, resins and paper with the dust fines obtained from the manufacture of exfoliated vermiculite, the coating providing an integrally formed, thin smooth friction reducing surface which is resistant to wear and prevents adherence to other metals, as in billets passing through a furnace.

Other objects and advantages will be apparent from the following description and in reference to the accompanying drawings wherein.

Figure 1:
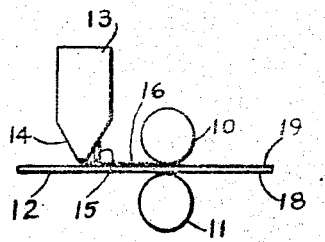
FIGURE 1 illustrates a method of applying the coating material herein described to hot metal plate.

Essentially the subject matter of this disclosure concerns the discovery of the beneficial application of waste fines which, as described, are obtained from the manufacture of vermiculite, as in making house-fill insulation. The waste fines are derived as an oily-feeling extremely light weight by-product dust when vermiculite is treated to expand the vermiculite material and blowing the vermiculite from the grit. This blowing raises a dust as a composite oily-feeling product which is analyzed as a combination of metal oxides and silica material. The composite fines are believed to be in a beneficially reacted or semi-reacted condition of particulate snowflake like crystal form of a size which passes through about a 400 to a 500 mesh sieve. The fine powder has a smooth non-gritty feel even between the teeth and a penetrating characteristic which when in contact with heated metal, at suitable temperature, seems to cause the composite fines to crawl into the pores of the metal and seal over the surface of the metal with a continuous non-porous film. This film reduces surface friction, is resistant to the building up of static charges, reduces penetration by harmful rays, and is resistant to wear and rust. The coating is also resistant to acids, alkali and salts, including fatty acids and oils, in addition to providing a sanitary coating which will withstand high temperatures up to about 3200° F. The coating also provides for coloring stainless steel with an integral appearing finish. The color may be modified by the manner of treatment, as hereinafter described, or in some instances by the addition of very slight amounts of a powder oxide pigment.

In the analysis of the coating on metals, it is reported not to gall or chafe and provides for reduction in surface friction, closure of pores in the metal, reduces carbon deposit and bacteria impregnation, is non-rusting and resistant to acids, alkali and salt, as herein described. The coating also provides a hard surface which tends to retard cosmic ray penetration and reduce the building up of static charges on metal and other surfaces including articles formed of paper and resinous-like material in conjunction with an increase in the fire resistance of resinous and waxy synthetic aliphatic and aromatic hydrocarbons.

More specifically, it has been discovered that when the separated byproduct fines are coated on metals, as stainless steel, the fine pores of the metal absorb the composition, or it seems to form thereover as an integral film lying completely over and combined with the surface of the metal, changing the stainless steel to a bronze to copper-like, gold or blue coloring, dependent upon the temperature treatment and length of time the coated metal is heated. As indicated, this coating fills the minute pores of the metal and provides a smooth even surface that reduces friction and prevents impregnation as by bacteria found in transportation of milk and is present in the baking industry. Thus, the fine particle sizes appears to bear a critical relationship to the method of coating and final product. Further, such coatings are wear resistant when applied to metals as draw rings, bearings and the like, or leading and trailing edges of airplanes, and also serves to prevent carbon deposit in engines as well as reducing friction and the building up of static electrical charges.

For example, the milk industry utilizes stainless steel tanks for trucking milk from the farms. Despite the very near non-porosity of the stainless steel, milk bacteria collects in the pores of the metal and after a short time of hauling, the milk sours rapidly. This souring is due to failure, of even a most careful cleaning, to remove all traces of such bacteria lodged in the pores of the metal. Similarly, in the baking industry the modern trend is to mix and convey the doughs through conduits which are difficult to clean. Consequently, difficulty has been encountered in bacteria lodging in the vats and pipes, causing rope and other detrimental results. Thus it will be recognized that a solution to these problems will be of great benefit when there is not only provided a simplification of cleaning but also an economy in savings of edible materials. In addition, the art has long sought an economical substitute for copper piping and a coating for tanks other than glass linings, which is resistant to alkali waters and the handling and holding of organic fatty acids.

To illustrate, one manner of applying the material to a stainless steel surface; there is coated over the face of the sheet a thin layer of approximately ⅛ inch dry material and the coated sheet is heated to a temperature of 850° F. for about 20 minutes to about one half hour or possibly to a dull red heat until of uniform color and preferably without any apparent changing of the crystalline form of the stainless steel. The dry powder does not burn or appear to melt to a fluid state, but levels out and seems to crawl completely over the surface of the metal and embed itself thereinto in seemingly integral combination therewith. Also, when heated with a gas flame or within an atmosphere filled with the coating material, the coloring appears on the side opposite the applied coating. It seems that on heating, the pores are enlarged and the coating is self impregnating to completely fill the voids and obtains a perfectly smooth self adhering bronze to copper and gold-like appearing finish, depending upon the degree and length of heating.

This finished metal can then be worked and fabricated into tanks or milk trucks, tank cars and other containers, as desired. Otherwise the tanks may be prefabricated, first and the coating applied by continuously floating the dry powder, by convection currents or slight air disturbance, in the metal container while it is maintained under heated condition of about 800° F. to about 1000° F. until uniformly covered with a solid and uniformly appearing colored coating. At the higher temperatures and longer heating the color takes on a gold hue, or for some stainless tableware, the heat may be controlled to produce a dark blue coloring, when the stainless steel is first washed with a dilute acid, as sulfuric.

For example, stainless steel dinnerware and particularly knives, forks and spoons when heated with a coating of the composite metal fines thereon, without first washing with a dilute sulfuric acid, and heated to about 750° F. start to take on a brassy or bronze coloring and as the temperature goes up to 850° F. and higher for about 20 to 30 minutes heating goes to a gold hue. When first washed with a weak sulfuric acid and then treated in the same manner the color becomes a deep dark blue. A slightly higher temperature can also be used with care being taken not to detrimentally change or affect the crystalline structure of the stainless steel.

While it will be understood that the stainless steel of the character used in building truck milk tanks will take a coating at a temperature of about 800° to 850° F. over a period of about one half hour, other metals may require relatively different temperatures according to their realtive hardness and porosity and the color may be different.

For example, a soft iron sheet, when coated with the composition, and heated to from about 500° F. or to a red heat will absorb or adsorb and obtain a uniform coating which is uniformly black. A method of applying the coating is to sprinkle a thin film of about ⅛ inch depth onto the surface of the metal and heat the coated metal to a red heat and bake the coating onto the metal, at that temperature, for a period of about 20 minutes or longer. The powder uniformly coats the metal with a dark black finish which is resistant to rust, fatty acids and salt solutions.

As indicated, one method of coating a stainless steel metal is to place the dry powder on the metal surface in a loose film form and then heat the metal to about 800° or higher until a uniform coating is obtained. Generally however, different metals of different hardness require different temperatures to obtain a relative enlargement of the pores which are impregnated with an overlying uniformly colored coating. Another method of applying the coating is to heat the metal in a confined space and gently float the powder onto the heated metal surfaces. A suitable manner of floating the herein described coating material onto a heating metal surface is to heat the metal with a gas burner which itself causes the heated space to be filled with a cloud-like atmosphere with the coating uniformly deposited on any of the exposed heated metal surfaces.

When coating engine surfaces, as in jet engines, the coating is applied before any carbon deposit takes place. The engine parts may be coated prior to installation, or otherwise a clean engine can be heated and coated in the manner described for applying an internal coating. When provided with the composite coating herein described, valves and the internal motor parts are less subject to carbon deposits, rust and attack by detrimental liquids and gases.

In addition, the coating is resistant to wear and heat. For example, bearing surfaces and gearing of inferior metal will withstand greater heat and friction when impregnated and/or coated with the composition, as described. Further, bearing surfaces when coated with the composite fines, as described, do not burn or freeze even when lubricant is lacking. Of course, such coatings will not replace lubricants where speed is a factor. The coating can be utilized on draw rings, in machine shop dies, used for coating magnesium to reduce friction and fire hazard. Hard metals are more difficult to coat and require higher temperatures and longer heating periods. In some instances, the coating material is applied to the metal by rubbing it into the heated surface of the metal and then baking the coating thereon. Electrode heating of the metal with the coating material will also serve to obtain a suitable coating on certain metals.

Aside from making stainless steel appear as copper tubing, the coating is applicable to ships' bottoms for decreasing sea plant and barnacle growths, in oil tanks as an aid against corrosion, preventing salt water deterioration of steel piers, undercoatings for paint, producing gold, bronze, copper and like finishes on automobiles and automobile parts, gold and other colored finished stainless steel tableware and many other applications, as described.

Essentially the coating is applied by heat treating the metal either covered with the powder or in an atmosphere of the powder, or other methods as hereinafter indicated. Burnishing or rubbing the powder into the hot metal and the length of heat treatment will produce different shades in stainless steel. The longer the heat treatment, the lighter in shade, from a bronze to gold color, the metal becomes. Softer metals are more readily coated. Harder metals require higher heat and longer treatment. Also coloring of cooking pots and pans with a sanitary coating which withstands heat that the metal of the pots and pans are normally subjected to has been accomplished.

Another beneficial application is the coating of weld joints which seem particularly subject to rust. In this instance, the composite powder is brushed on coated onto the heated metal joint and baked into and on the metal to provide a rust resistant coating. Further, a coating of the composite powder, either in dry form, or in alternative form of soap or other solution, prevents weld splatter from sticking.

The following examples illustrate various ways in which the coating is applied to metals and the color result.

As illustrated in FIGURE 1 there is shown a pair of conventional hot rolls through which the heated metal plate 12 is normally pressed as it is formed in a mill. By providing a feed funnel 13, a thin film of the composite powder, as herein described, is fed onto the surface of the metal. For purposes of illustration the funnel 13 is provided with a feed nozzle having an elongated lower plate 14 over which the powder slides onto the surface of heated plate 12 in thin film form of about ⅛ inch thickness as determined by the shorter elongated plate 15 which acts as a knife blade to spread a film of the loose powder 16 over the hot metal plate 12 as it passes between rolls 10 and 11.

The temperature of the heated plate 12 as it is passed between rollers 10 and 11 is of course dependent upon the particular metal. Different metals are thus formed with the herein defined coating at different heat and the temperature of red to white heat varies for example from a relative low degree of about 750° for soft metal, as low carbon steel, about 850° to about 1000° for stainless steel to about 2700° to 3000° for steels of high carbon content. In each of the different metals the composite powder appears to form an integral union or bond imbedded with the surface metal oxide when it undergoes a heat treatment therewith. The coated metal section 18 passes from the rolls 10 and 11 with a homogeneous coating 19 which seems to be anodized therein and thereon. Further heat treatment of the coated metal as it passes from the rolls is preferably provided for a short period to bake the coating into the metal and change the shading, if desirable.

Another method of application is to float the composite powder in an air chamber 20 heated by gas burners 21 and 22 and pass a metal sheet 23 therethrough. In this arrangement the chamber 20 is closed by top and bottom walls 24 and 25, respectively, and side walls 26 and 27, including side wall 28 and an opposite side wall (not shown). The side walls 26 and 27 are provided with slots (not shown) for passing the metal sheet material through the chamber 20. Nozzle feeds 30 and 31 are provided to gradually feed the composite powder into chamber 20 adjacent the burners 21 and 22, respectively. The heat currents float the powder about the chamber 20 and onto the heated metal surfaces which obtain a uniform overall colored coating 23¹ etched or anodized into and completely covering the metal surfaces. A pair of heated rolls 33 and 34 may be provided adjacent the outlet side of the chamber 20 to further anodize or react and embed the coating 23¹ into and on the upper and lower surfaces of the metal sheet 23.

For individual pieces, the composite powder material may be applied uniformly thereover and suspended in a gas oven which is heated to a suitable temperature to obtain the color desired in a uniformly reacted and overlaying relationship. For example, a soft iron plate coated over the upper surface with a thin layer, about ⅛ inch of the composite powder, when suspended in a gas fired oven and heated to about 450°, or a dull red heat obtains a uniform dull velvety colored black surface completely over the top, side and back surfaces. This black surface is seemingly embedded into and reacted with the oxide of the metal. The coated metal when tested for almost a year period under normal outside weather conditions and in comparison with standard tool steel, showed no signs of rust or deterioration. Whereas the tool steel was covered with rust.

An iron spoon was coated by the above process and used for dipping sulfuric acid. The treated spoon is still in use after daily use over a period of several months with no apparent deterioration. By comparison uncoated like spoons lasted for only a few weeks and each and everyone showed visible deterioration.

Figure 2:
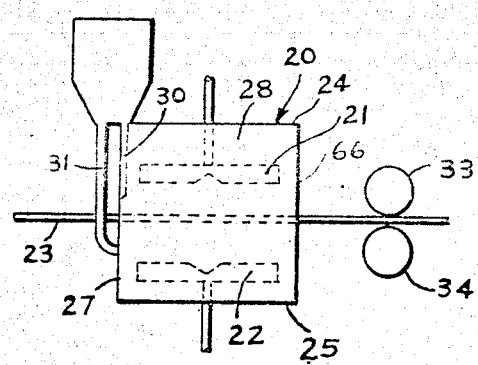
FIGURE 2 illustrates a modification of FIGURE 1.
Figure 3:
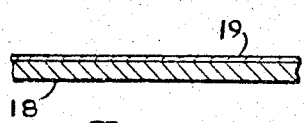
FIGURE 3 is a metal coated prone surface with the material herein described.
Figure 4:
FIGURE 4 is a modification of FIGURE 3.
Figure 5:
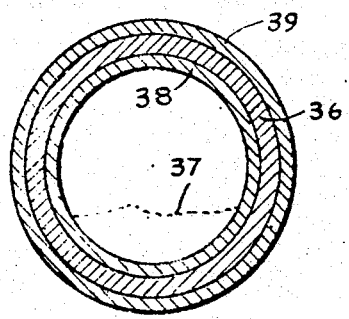
FIGURE 5 is a cross-section view of a metal cylinder coated on the inner surface with the material herein described.
Figure 6:
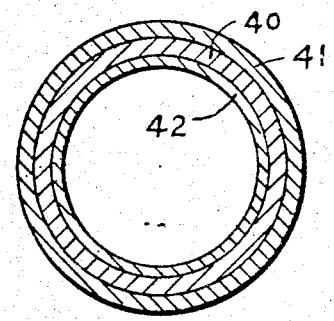
FIGURE 6 illustrates a metal cylinder coated on the outer surface with the material herein described.

As other examples of oven heating, a stainless steel piece of the character of that used in building stainless steel truck milk tanks was coated over with the composite powder and suspended in a gas fired furnace as shown in FIGURE 2. As the metal was heated to about 750° it took on a bronze to copper coloring, when the heat was increased to about 850° F. the copper hue became more pronounced after about 20 minutes of heating. Upon continued heating for another 15 minutes the color changed to a gold hue and throughout the heating periods, at increased heats below the recrystalline temperature, the degree of heat and length of heating time appeared to effect the color changes. To further test this effect a piece of stainless steel tubing 36 was partially filled to about the point 37 with the composite powder and heated in the gas fired oven. When a copper colored hue appeared, the tube 36 was removed and found to have a copper coloring 38 appearing as an integral part all about the inside of the piece 36 and lighter to goldish color 39 over the outside surface.

Another tube piece 40 was heated in a gas fired oven to about 850° F. with the composite powder sprinkled and circulated about the outside surface. After about 20 to 30 minutes an integral overall copper color coating 41 was obtained. The inside surface appeared to be covered with an overall integral lighter shade coating 42.

In each case of testing, the metal, when coated by the heat treatment of the composite powder to form integral protective coatings, the color was changed and appeared to be combined as a part of the metal. The colored surfaces are of glass-like smoothness with hard surfaces characteristics that still retained some flexibility which permitted bending of the metal without rupturing the coating. For example a gold-hued strip of stainless steel about 8 inches long was bent into a circle and then relatively straightened without showing crack lines, or appearing to break the composite formed integral appearing colored surface.

Figure 7:
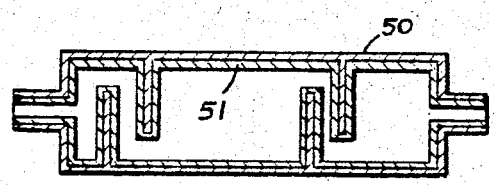
FIGURE 7 illustrates a muffler unit having a coating of the material herein described.

As illustrated in FIGURE 7, muffler metal 50 is representative of a motor part which is subject to deterioration with hot combustion gases and usually becomes blackened with a hardened crust of rust and carbon soot. When coated with the composite metal fines, as herein described, in the form of a thin film 51, the metal is protected and after months of use retained its outer natural surface color. The inner surface retained the original color of the film and there appeared to be no rust or carbon deposit as is normally expected.

Figure 8:
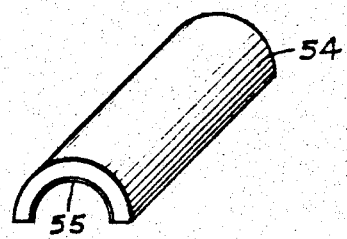
FIGURE 8 illustrates a bearing surfaced with the material herein described.

Further, as represented in FIGURE 8, a bearing member 54 when prefabricated with a film 55 of the composite by-product dust fines, or impregnated therewith in its manufacture, provides for a long wearing surface with a minimum of friction. The coating may be applied by a heat treatment in the presence of the composite powder, as described, or otherwise mixed in the tippler. With the metal in the molten state and at temperatures below about 3200° F. the composite of the described powder, when added thereto, comes to the surface. This aids in providing for a smoother surface with less pore voids. Such addition may also aid in getting case hardening of carbon steel.

The surfacing of molds with the composite film or merely spreading the composite powder over the mold surface also aids in freeing or separation of molded material from the mold forms. Also, the coating is not easily scratched with a knife blade and the coated metal, as herein described in grain cars renders the surface less subject to wear by scratching by grain hulls.

Figure 9:
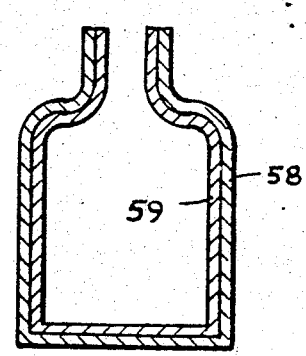
FIGURE 9 illustrates a container lined with the material herein described.

There is illustrated in FIGURE 9 a milk can or other container 58 of stainless steel provided with a baked on finish 59 of the composite crystalline dust fines of metal oxides and silica, as described. The coating is applied by floating the composite dust fines in the container while it undergoes a heat treatment at a temperature on the order of that described, until a uniformly appearing smooth finish is obtained. In the event that any of the composite dust fines float about the exterior of the container, this exterior also takes on a finish of a lighter shade but also of the pore closing and integral appearance of the inside coating. Otherwise, when the container is placed in a gas fired furnace oven and the composite fines, as described, are floated about the exterior of the container, the outside surface obtains a darker coppery shade and the inside obtains a lighter to gold hue shade.

In conjunction with the coating of metals it may be well to indicate an additional application which is made during hot press punching. In this instance, the preferred composite powder, as described, is dusted over the metal to be punch pressed and when the metal is punched, usually at about 2000°, more or less, the friction of the punch embeds the powder in the metal pores and coats the surface with a lubricant and rust resistant finish. In addition, the punch is lubricated and its life is more than doubled. It seems that the higher the pressure and temperature, the lighter is the shade of the coating, even on mild steel. In addition, the metals coated with this composite powder do not tend to build up static charges and also provide surfaces which are resistant to harmful radiation. By test the composite crystalline dust fines when encasing a sample of active radiation material, used to test a Geiger counter, will stop the counter. Another test made with paper impregnated with about ⅓ by composite powder to ⅔ paper pulp and about 1½ to 1¾ inches thick, reduced the counter's action from 40 to about 20 to 25 when used only as a shield between the ore sample and the counter. Otherwise, when used to coat metal electric switch covers, which needed to be turned off with a wooden stick, the switches can now be handled safely with the fingers without the danger of the static charge. When sprinkled very lightly over a rug that normally induces a static charge, the charge does not build up. Thus, the coatings provide for resistance to radiation and to the building up of static charges.

In addition the preferred crystalline fines are particularly applicable to surfacing rolls of metal, resin and the like for reduction of static charges tending to be built-up thereon under the friction of belts and fibers passing thereover. Such application may be made by mixing the fines with a suitable vinyl resin or other adhesive and coating the rolls therewith. Further, these fines are compatible with resinous materials and paper pulp mixtures, to increase their heat resistance and provide improved bearing surfaces. Such mixtures have been made with paper pulp and resinous material (urea-formaldehyde, phenol-formaldehyde, vinyl resin and the like) in the proportion of about ⅓ fines to ⅔ paper pulp, or resin, either by volume or by approximate weight. The control factor is to retain as much tensile strength as necessary and yet provide an improvement in heat resistance or a surfacing of reduced friction and in some instances, of fairly slow rotation, a sliding surface which is comparatively self lubricating.

For example, to provide an improved resin bearing mixture the herein described by-product dust fines are added to the liquid resin composition, before molding and hardening, making a mixture as follows:

⅙ part by weight polyvinyl chloride resin with about .05 part catalyst
⅙ part by weight composite by-product fines, as described.

The catalyst was benzyl peroxide. However, other conventional and known catalyst may be used. Likewise similar resins and known catalyst combinations are known to the art and to which the by-product dust fines, as described, may be added.

Having thus described my invention, improvement or discovery in the best manner available with the experiments performed, it will be apparent that some modifications are possible within the scope of the following claims.

I claim:

1. In a method of providing metal with a coating of a composite of metal oxides and silica material, the steps consisting essentially of
   heating the metal to a temperature sufficient to open the pores of said metal,
   and treating the heated metal in an atmosphere of a powder of fine crystalline material of a particle size which passes through about a 400 to a 500 mesh sieve and consisting essentially of an oily feeling composite of a uniformly appearing crystalline form of metal oxides and silica material prepared by heat-expanding vermiculite to produce exfoliated vermiculite and by-product dust fines consisting essentially of metal oxides and silica material and screening and separating said dust fines from said exfoliated vermiculite,
   thereby effecting an embedding of the said fine crystalline material into the pores of the surface of the metal while heated to said temperature,
   and providing a thin tightly adherent coating of the said metal oxides and silica material on said metal material.

2. The method of claim 1 wherein the metal is stainless steel,
   and controlling the time and degree of heating of the stainless steel to effect a coloring thereof from substantially a bronze to a gold hue.

3. The method of claim 1 wherein the metal is stainless steel,
   and controlling the time and degree of heating of the stainless steel to effect a coloring thereof of substantially a copper hue.

4. A metal surface provided with a friction and static electrical charge-reducing coating film consisting essentially of a layer of metal oxides and silica material formed from an oily-feeling composite of dust fines of a particle size which passes through a sieve of about 400–500 mesh on said surface,
said dust fines being prepared by heat-expanding vermiculite to produce exfoliated vermiculite and by-product dust fines consisting essentially of metal oxides and silica material, screened and separated from said exfoliated vermiculite.

5. Stainless steel having a surface thereon having a color coating integral with said surface throughout the entire extent thereof,
   said color coating consisting essentially of a finish obtained by a uniform layer of an oily-feeling crystalline composite of metal oxides and silica material on said surface formed from dust fines of a particle size which passes through a sieve of about 400–500 mesh,
   said dust fines being prepared by heat-expanding vermiculite to produce exfoliated vermiculite and by-product dust fines consisting essentially of metal oxides and silica material, screened and separated from said exfoliated vermiculite and associated grit.

6. A stainless steel base having a uniformly appearing color coating provided by the baked-on finish of an oily-feeling composite of metal oxide and silica material prepared by heat-expanding vermiculite to produce exfoliated vermiculite and by-product dust fines consisting essentially of metal oxides and silica material and screening and separating said dust fines of a particle size which passes through about a 400–500 mesh sieve from said exfoliated vermiculite and associated grit.

7. A prefabricated product having a thin film surface coating composition thereon resistant to radiation and the building up of static electrical charges consisting essentially of a uniform layer of an oily-feeling crystalline composite of metal oxides and silica material prepared by heat-expanding verimiculite to produce exfoliated vermiculite and by-product dust fines consisting essentially of metal oxides and silica material and screening and separating said dust fines of a particle size which passes through about a 400–500 mesh sieve from said exfoliated vermiculite and associated grit.

8. As an article of manufacture, a prefabricated product comprised of metal impregnated with a crystalline oily-feeling composite of dust fines of metal oxides and silica material prepared by heat-expanding vermiculite to produce exfoliated vermiculite and by-product dust fines consisting essentially of metal oxides and silica material and screening and separating said dust fines of a particle size which passes through about a 400–500 mesh sieve from said exfoliated vermiculite and associated grit.

9. The method of coloring stainless steel comprising the steps of heating the stainless steel to a high temperature below its recrystallization temperautre, exposing the heated stainless steel to an atmosphere of an oily-feeling composite of metal oxides and silica material particles prepared by heat-expanding vermiculite to produce exfoliated vermiculite and by-product dust fines consisting essentially of metal oxides and silica material and screening and separating said dust fines of a particle size which passes through about a 400–500 mesh sieve from said exfoliated vermiculite and associated grit.

References Cited by the Examiner

UNITED STATES PATENTS

| | | | |
|---|---|---|---|
| 1,711,603 | 5/1929 | Lay | 117—22 |
| 1,922,448 | 8/1933 | Miner | 252—378 |
| 2,075,388 | 3/1937 | De Cloud. | |
| 2,167,317 | 7/1939 | Stenson | 117—87 |
| 2,215,295 | 9/1940 | Morrill | 117—135.1 |
| 2,340,461 | 2/1944 | Gage et al. | 252—378 |
| 2,364,436 | 12/1944 | Fusch et al. | 117—135.1 |
| 2,394,843 | 2/1946 | Cooke et al. | 106—290 |
| 2,450,327 | 9/1948 | Cogan et al. | 117—160 |

WILLIAM D. MARTIN, *Primary Examiner.*

T. G. DAVIS, *Assistant Examiner.*